(12) United States Patent
Robbins et al.

(10) Patent No.: US 7,991,692 B2
(45) Date of Patent: Aug. 2, 2011

(54) ELECTRONIC PAYMENT INSTRUMENT AND PACKAGING

(75) Inventors: Peter Robbins, Denver, CO (US); Keith Newbrough, Parker, CO (US); Ken Algiene, Littleton, CO (US)

(73) Assignee: First Data Corporation, Greenwood Village, CO (US)

( * ) Notice: Subject to any disclaimer, the term of this patent is extended or adjusted under 35 U.S.C. 154(b) by 449 days.

(21) Appl. No.: 11/539,858

(22) Filed: Oct. 9, 2006

(65) Prior Publication Data

US 2008/0086418 A1    Apr. 10, 2008

(51) Int. Cl.
*G06Q 40/00* (2006.01)
*G06K 19/00* (2006.01)

(52) U.S. Cl. .......................................... 705/41; 235/487

(58) Field of Classification Search ............... 705/35–42
See application file for complete search history.

(56) References Cited

U.S. PATENT DOCUMENTS

| | | |
|---|---|---|
| 4,106,062 A | 8/1978 | Foote |
| 4,855,583 A | 8/1989 | Fraser et al. |
| 5,074,593 A | 12/1991 | Grosso |
| 5,518,122 A | 5/1996 | Tilles et al. |
| 5,585,787 A | 12/1996 | Wallerstein |
| 5,913,203 A | 6/1999 | Wong et al. |
| 5,918,909 A | 7/1999 | Fiala et al. |
| 5,921,584 A | 7/1999 | Goade, Sr. |
| 5,936,227 A | 8/1999 | Truggelmann et al. |
| 5,937,394 A | 8/1999 | Wong et al. |
| 5,955,961 A | 9/1999 | Wallerstein |
| 5,956,699 A | 9/1999 | Wong et al. |
| 6,224,108 B1 | 5/2001 | Klure |
| 6,248,199 B1 | 6/2001 | Smulson |
| 6,299,530 B1 | 10/2001 | Hansted et al. |
| 6,353,420 B1 | 3/2002 | Chung |
| 6,356,196 B1 | 3/2002 | Wong et al. |
| 6,471,127 B2 | 10/2002 | Pentz et al. |
| 6,561,432 B1 | 5/2003 | Vedder et al. |
| 6,588,658 B1 * | 7/2003 | Blank ........................ 235/380 |
| 6,592,044 B1 | 7/2003 | Wong et al. |
| 6,607,127 B2 | 8/2003 | Wong |
| 6,609,654 B1 | 8/2003 | Anderson et al. |
| 6,644,555 B1 | 11/2003 | Berney |

(Continued)

FOREIGN PATENT DOCUMENTS

WO    WO 98/14900    4/1998

(Continued)

OTHER PUBLICATIONS

"SmartMetric Card With Embedded Fingerprint Scanner Is Foolproof Internet Payment/Transaction Solution; Credit Card-Sized Product is Versatile, Practical; Touching Surface Validates Cardholder, Eliminating Need to Transmit Credit/Debit Account Numbers." PR Newswire Jun. 19, 2006 Business Dateline, ProQuest. Web. Mar. 25, 2011.*

(Continued)

*Primary Examiner* — Ella Colbert
*Assistant Examiner* — Mohammad Z Shaikh
(74) *Attorney, Agent, or Firm* — Kilpatrick Townsend and Stockton LLP

(57) ABSTRACT

Methods and systems provide and utilize a transceiver-based electronic payment device to consumers in an arrangement which allows for convenient carrying of the device and payment using the device.

35 Claims, 13 Drawing Sheets

U.S. PATENT DOCUMENTS

| | | |
|---|---|---|
| 6,685,097 B1 | 2/2004 | Housse |
| 6,688,529 B1 | 2/2004 | Goade, Sr. |
| 6,702,185 B1 | 3/2004 | Zercher |
| 6,727,802 B2 | 4/2004 | Kelly et al. |
| 6,753,341 B1 | 6/2004 | King |
| 6,761,319 B2 | 7/2004 | Peachman et al. |
| 6,805,288 B2 | 10/2004 | Routhenstein et al. |
| 6,811,082 B2 | 11/2004 | Wong |
| 6,817,530 B2 | 11/2004 | Labrec et al. |
| 6,827,260 B2 | 12/2004 | Stoutenburg et al. |
| 6,827,264 B2 | 12/2004 | Morgavi |
| 6,886,742 B2 | 5/2005 | Stoutenburg et al. |
| 6,912,398 B1 | 6/2005 | Domnitz |
| 7,070,095 B1 * | 7/2006 | Gandel et al. ............. 235/380 |
| 7,086,584 B2 | 8/2006 | Stoutenburg et al. |
| 7,097,108 B2 | 8/2006 | Zellner et al. |
| 7,104,439 B2 | 9/2006 | Dewan et al. |
| 7,137,552 B1 * | 11/2006 | Lasch et al. ............. 235/380 |
| 7,147,151 B2 * | 12/2006 | Lasch et al. ............. 235/380 |
| 7,168,615 B2 * | 1/2007 | Smith ............. 235/380 |
| 7,234,637 B2 | 6/2007 | Berthe |
| 7,293,704 B2 * | 11/2007 | Smith ............. 235/383 |
| 7,309,007 B2 | 12/2007 | Kean |
| 7,429,927 B2 * | 9/2008 | Bonalle et al. ............. 340/572.8 |
| 2002/0049669 A1 * | 4/2002 | Bleser et al. ............. 705/39 |
| 2002/0096570 A1 | 7/2002 | Wong et al. |
| 2003/0061168 A1 | 3/2003 | Routhenstein |
| 2003/0069846 A1 * | 4/2003 | Marcon ............. 705/41 |
| 2003/0150762 A1 * | 8/2003 | Biller ............. 206/461 |
| 2003/0150919 A1 | 8/2003 | Blank |
| 2004/0089724 A1 * | 5/2004 | Lasch et al. ............. 235/487 |
| 2004/0129785 A1 | 7/2004 | Luu |
| 2004/0131760 A1 | 7/2004 | Shakespeare |
| 2004/0144846 A1 * | 7/2004 | Lasch et al. ............. 235/487 |
| 2004/0225613 A1 * | 11/2004 | Narayanaswami et al. ..... 705/64 |
| 2004/0230535 A1 * | 11/2004 | Binder et al. ............. 705/64 |
| 2004/0256469 A1 * | 12/2004 | Faenza et al. ............. 235/492 |
| 2005/0061889 A1 * | 3/2005 | McGee et al. ............. 235/487 |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0104718 A1 | 5/2005 | Casto et al. |
| 2005/0137986 A1 | 6/2005 | Kean et al. |
| 2005/0177480 A1 | 8/2005 | Huang |
| 2005/0205665 A1 * | 9/2005 | Lasch et al. ............. 235/380 |
| 2005/0211760 A1 * | 9/2005 | Dewan et al. ............. 235/375 |
| 2005/0230485 A1 * | 10/2005 | Ross et al. ............. 235/492 |
| 2005/0247798 A1 * | 11/2005 | Graves et al. ............. 235/493 |
| 2005/0248459 A1 * | 11/2005 | Bonalle et al. ............. 340/572.8 |
| 2006/0028319 A1 | 2/2006 | Kean et al. |
| 2006/0151348 A1 * | 7/2006 | Willard ............. 206/449 |
| 2007/0084913 A1 * | 4/2007 | Weston ............. 235/380 |
| 2007/0158435 A1 * | 7/2007 | Lasch et al. ............. 235/487 |
| 2007/0162381 A1 * | 7/2007 | Petralia et al. ............. 705/38 |
| 2007/0266605 A1 * | 11/2007 | Halbur et al. ............. 40/674 |
| 2007/0288371 A1 * | 12/2007 | Johnson ............. 705/41 |
| 2008/0046747 A1 * | 2/2008 | Brown et al. ............. 713/182 |

FOREIGN PATENT DOCUMENTS

WO      WO 01/88659 A2    11/2001

OTHER PUBLICATIONS

Peter Lucas, and Kate Fitzgerald. "Adding convenience to wireless payments." Credit Card Management Nov. 1, 2003: ABI/INFORM Global, ProQuest. Web. Mar. 25, 2011.*

"QI Systems Developing Products for RFID-Enabled Smart Card Applications", Wireless News, NA, Jul. 22, 2005, p. 1.*

"TI Embraces Prox Card Standard: Texas Instrument's ISO 14443 payment platform promises faster data transfer rates and more security." RFID Journal Mar. 6, 2003, http://rfidjournal.com/article/articleprint/327/-1/1.

U.S. Appl. No. 10/807,462, filed Mar. 3, 2004.
U.S. Appl. No. 11/005,864, filed Dec. 6, 2004.
U.S. Appl. No. 11/671,766, filed Feb. 6, 2007.
U.S. Appl. No. 11/243,588, filed Oct. 4, 2005.
U.S. Appl. No. 11/381,630, filed May 4, 2006.
U.S. Appl. No. 11/695,968, filed Apr. 3, 2007.

* cited by examiner

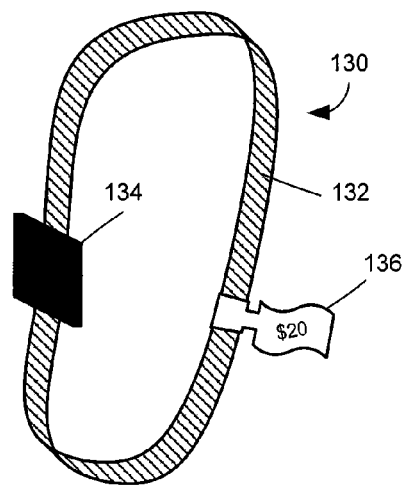
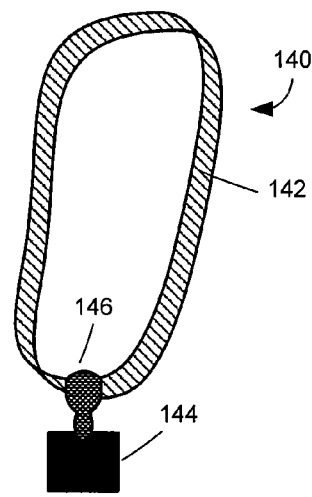
Fig. 1E          Fig. 1F
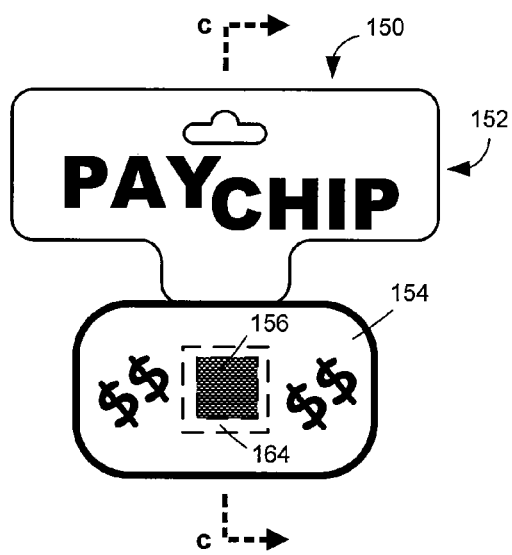
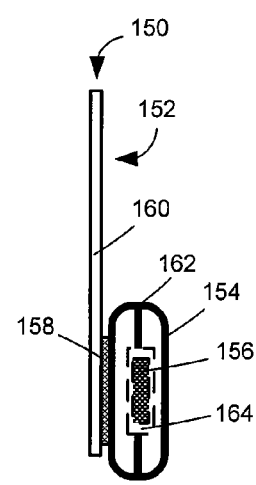
Fig. 1G          Fig. 1H
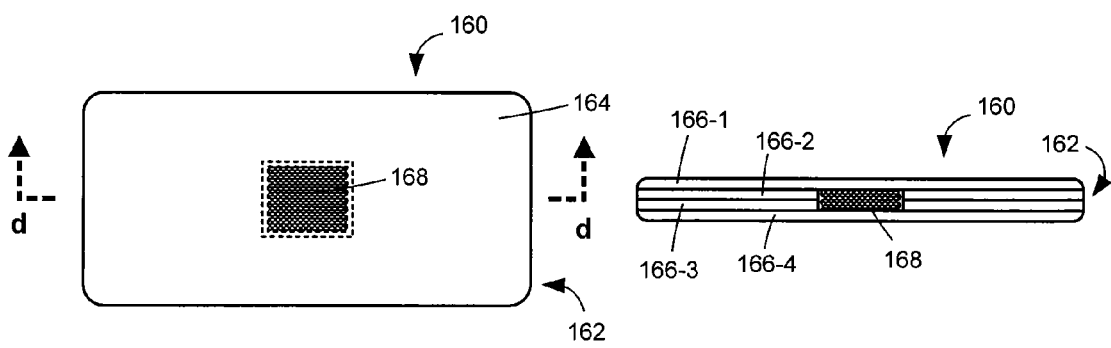
Fig. 1J          Fig. 1K

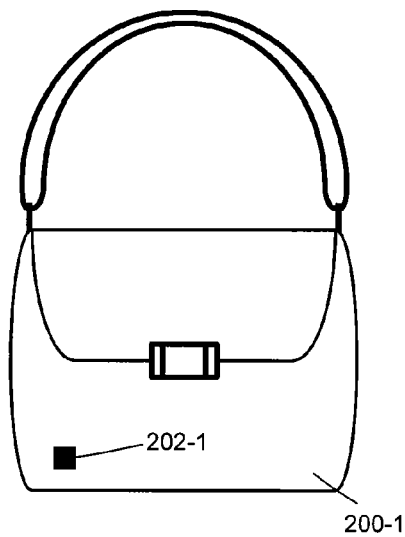
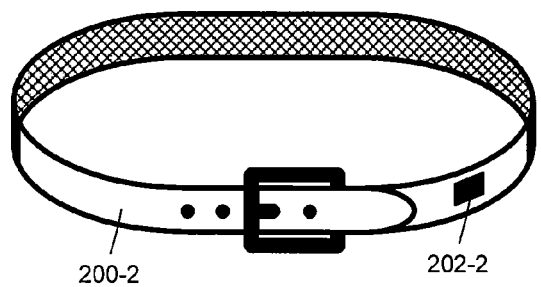
Fig. 2A
Fig. 2B
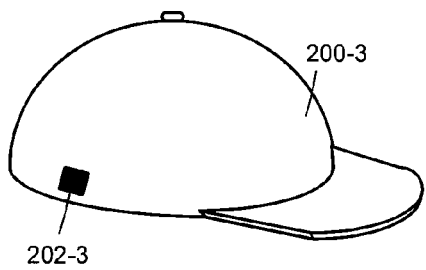
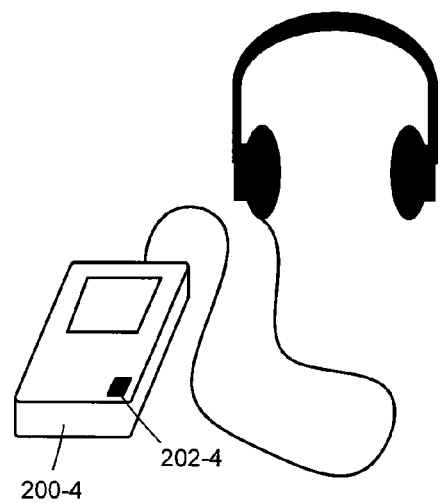
Fig. 2C
Fig. 2D
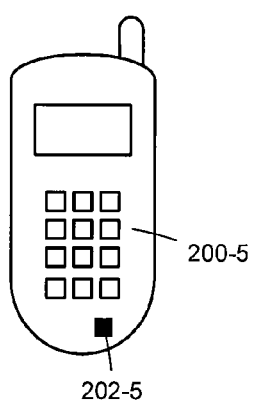
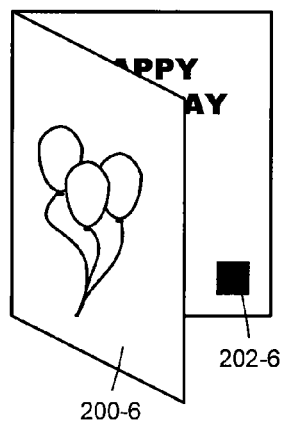
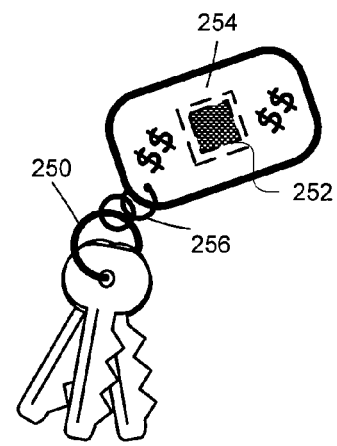
Fig. 2E
Fig. 2F
Fig. 2G

|   | CODE | ACCOUNT | ACTIVE? | BALANCE | ATTRIB. 4 | ... | ATTRIB. N |
|---|---|---|---|---|---|---|---|
| 706-1 | CODE | ACCOUNT | ACTIVE? | BALANCE | ATTRIB. 4 | ... | ATTRIB. N |
| 706-2 | 00000001 | 419352801 | Y | $1.93 | ??? | ... | ??? |
| 706-3 | 00000002 | 687320917 | N | $0.00 | ??? | ... | ??? |
| 706-4 | 00000003 | 287394011 | Y | $49.82 | ??? | ... | ??? |
| 706-5 | 00000004 | 178293045 | Y | $12.36 | ??? | ... | ??? |
|   | 00000005 | 687239004 | N | $50.00 | ??? | ... | ??? |
| 706-N | : | : | : | : | : | : | : |
|   | 49758201 | 000000000 | N | $25.00 | ??? | ... | ??? |
|   | : | : | : | : | : | : | : |

ELECTRONIC PAYMENT INSTRUMENT AND PACKAGING

BACKGROUND OF THE INVENTION

This application relates generally to systems and methods for electronic payment devices. More specifically, this application relates to systems and methods for providing a transceiver-based device to consumers for executing electronic payment transactions.

Over the past decades, a new technology has caused a significant shift in point of sale (POS) transactions away from cash and checks and towards electronic payment devices. Consumers have found added convenience with devices like credit cards, debit cards, and stored-value cards.

Credit and debit cards typically comprise a standard-sized plastic card with a magnetic stripe, or magstripe. These magstripes store a large amount of information, including account number, country code, account holder name, expiration date, and other discretionary and proprietary data. Most POS's which accept credit and debit cards have magstripe readers, which read the information from the magstripe. The reader then communicates the information to the appropriate financial institution to verify and complete the transaction.

Unfortunately, there are a number of issues with magstripe technology. First, magstripes are prone to destruction, usually through scratching or exposure to magnets. Second, magstripe readers are often bulky, expensive, and unreliable; they must be large enough to accommodate swiping the magstripe through the reader, and must comprise a number of mechanical and magnetic elements for reading the information from the magstripe. Third, because credit and debit cards tend to be linked to financial accounts, it is difficult to control their use. For example, a parent may find it difficult to limit a child's ability to spend, or a victim of identity theft may be susceptible to large fraudulent charges. Fourth, merchants often incur large fees from financial institutions for processing credit or debit transactions.

Partly in response to these last two issues, financial institutions began offering "stored value" cards, or "electronic purse applications." With these cards, a cash equivalency is stored on the card, rather than the card being linked to an account. Value may be added to the card either by transferring cash or by transferring money from a financial institution, at a kiosk, automated teller machine (ATM), by phone, or by some other means. Because the cards carry only a specific cash equivalence, cardholders may better limit their susceptibility to large unauthorized transactions. Further, because the cards are not associated with financial accounts, merchants may incur lower processing fees for handling transactions with stored value cards.

Still, stored value cards also have issues. For example, in order to reliably store the cash equivalence of the card and be able to update the remaining balance, the cards typically require relatively large, expensive, and powered on-board electronics. Further, stored value cards are typically delivered to consumers in a credit card-like form, making them potentially inconvenient to carry.

Thus, though current electronic payment devices are more convenient than cash or checks, they remain relatively inconvenient. It may therefore be desirable to offer consumers electronic payment devices which are convenient to carry and easy to use for payment, while still inexpensive for merchants to support.

BRIEF SUMMARY OF THE INVENTION

Embodiments of the invention can address this condition in the art by providing a small, transceiver-based electronic payment device to consumers in an arrangement which allows for convenient carrying and use of the device, with low transaction costs for merchants.

A first set of embodiments provides an electronic payment device arrangement for use by a consumer. The device arrangement comprises a transceiver, and attachment, and packaging. The transceiver is identifiable by a code. The attachment is coupled with the transceiver and configured to attach the transceiver to a carrier. The packaging is removably coupled with the transceiver. The packaging is also configured to display the transceiver for sale at a device purchase location.

In some embodiments, the code may comprise account information; while in other embodiments, the code may comprise routing information. In some of these latter embodiments, the routing information may comprise host identifiers associated with a plurality of host systems. The transceiver may then be configured to be read by a reader which is communicatively coupled with the plurality of host systems. The reader may then be configured to use the routing information to communicate with the host system associated with the host identifier.

In other embodiments, the transceiver may be configured for activation at the device purchase location. In certain of these embodiments, activation of the transceiver may comprise removing at least a portion of the packaging.

In other embodiments, the transceiver may be configured to be read by a reader located at a point of sale. In certain embodiments, the reader may be communicatively coupled with a host system.

In still other embodiments, the device arrangement may further comprise an enclosure operatively coupled with the transceiver. In certain embodiments, the packaging may comprise the enclosure, the attachment, or both. In certain other embodiments, the enclosure may comprise the attachment.

A second set of embodiments provides an electronic payment device arrangement for use by a consumer. The device arrangement comprises a transceiving means, an attachment means, and a packaging means. The transceiving means is identifiable by a code. The attachment means is coupled with the transceiving means and configured to attach the transceiving means to a carrying means. The packaging means is removably coupled with the transceiving means. The packaging means is also configured to display the transceiving means for sale at a device purchase location.

In some embodiments, the code may comprise account information; while in other embodiments, the code may comprise routing information. In some of these latter embodiments, the routing information may comprise host identifiers associated with a plurality of host systems. The transceiving means may then be configured to be read by a reading means which is communicatively coupled with the plurality of host systems. The reading means may then be configured to use the routing information to communicate with the host system associated with the host identifier.

In other embodiments, the transceiving means may be configured for activation at the device purchase location. In still other embodiments, the transceiver may be configured to be read by a reading means located at a point of sale. In certain embodiments, the reading means may be communicatively coupled with a host system. In still other embodiments, the device arrangement may further comprise an enclosing means operatively coupled with the transceiver.

A third set of embodiments provides a system for electronic payment. The system comprises a plurality of payment device arrangements, a reader, a host system, and a database. Each payment device arrangement comprises at least one transceiver, an attachment, and packaging. The attachment is coupled with the transceiver and configured to attach the transceiver to a carrier. The packaging is removably coupled with the transceiver and configured to display the at least one transceiver for sale at a device purchase location. The reader is configured to receive from the at least one transceiver a signal comprising a code being at least one of a set of codes and associated with the at least one transceiver and an account, and transmit the received code and an instruction to a host system. The host system is communicatively coupled with the reader and configured to receive the transmitted code and the transmitted instruction from the reader, and perform a function according to the transmitted instruction using the transmitted code and a function attribute. The database is communicatively coupled with the host system and configured to store the set of codes and a table. The table comprises a set of related attributes for each of the set of codes. The function attribute is at least one of the set of related attributes.

In some embodiments, the instruction may comprise an update command, which updates the set of related attributes related to the account associated with the code. In these embodiments, the function updates the function attribute as directed by the update command. In certain of these embodiments, the update command may comprise any or all of an activate command for activating the account for a certain monetary amount, a de-activate command for de-activating the account, or a recharge command for recharging a balance associated with the account.

In some other embodiments, the instruction may comprise an interrogate command for interrogating the set of related attributes related to the account associated with the code. In these embodiments, the function interrogates the function attribute as directed by the interrogate command. In certain of these embodiments, the interrogate command may comprise either or both of a validate command for validating the activated status of the account, or a balance inquiry command for checking a balance associated with the account.

A fourth set of embodiments provides a method for updating attributes relating to an electronic payment apparatus. The method comprises providing a plurality of electronic payment device arrangements, receiving an instruction and a signal, and updating a set of related attributes as instructed by the instruction. Each of the electronic payment device arrangements comprises at least one transceiver, an attachment, and packaging. The attachment is coupled with the at least one transceiver and configured to attach the at least one transceiver to a carrier. The packaging is removably coupled with the at least one transceiver and configured to display the at least one transceiver for sale at a device purchase location. The received signal is transmitted from the at least one transceiver and comprises a code. The code is one of a set of codes each associated with the at least one transceiver and an account. The set of related attributes relates to the at least one transceiver associated with the code.

In some embodiments, the method further comprises removing the at least one transceiver from the packaging, and attaching the at least one transceiver to the carrier with the attachment. In some embodiments, the method may further comprise using the at least one transceiver to execute a payment transaction.

In certain embodiments, the receiving step of the method may comprise reading the signal at a reader, transmitting the instruction and the signal from the reader to a host system, and receiving at the host system the instruction and the signal.

In other embodiments, the instruction may comprise an account status change command for changing a status of the account associated with the code, changing the status of the account comprising at least activating the account for a certain monetary amount, de-activating the account, or recharging a balance associated with the account. In still other embodiments, the instruction may comprise an interrogate command for interrogating the set of related attributes related to the account associated with the code, interrogating the set of related attributes comprising at least validating a status of the account, or checking a balance associated with the account.

In yet other embodiments, the instruction may comprise a payment command. In these embodiments, updating the set of related attributes as instructed by the instruction may comprise checking a balance associated with the transceiver to verify that the balance is appropriate for executing a payment transaction, and adjusting the balance to reflect the execution of the payment transaction when the balance is appropriate. In certain of these embodiments, the updating step may further comprise adjusting the set of related attributes to reflect a failed transaction when the proper balance is unavailable. In certain others of these embodiments, the updating step may further comprise communicating failure of the transaction to the reader when the proper balance is unavailable. In still others of these embodiments, adjusting the balance comprises decrementing the balance.

A fifth set of embodiments provides a method for distributing an electronic payment apparatus for sale. The method comprises receiving a plurality of electronic payment device arrangements, displaying the plurality of arrangements on a display apparatus for sale at a device purchase location, and distributing at least one of the plurality of arrangements to a consumer upon purchase by the consumer. Each arrangement comprises at least one transceiver, an attachment coupled with the at least one transceiver and configured to attach the at least one transceiver to a carrier, and packaging removably coupled with the at least one transceiver and configured to display the at least one transceiver for sale at the device purchase location.

In some embodiments, the method may further comprise removing the at least one transceiver from the packaging, and attaching the at least one transceiver to the carrier with the attachment. In other embodiments, the method may further comprise using the at least one transceiver to execute a payment transaction. In still other embodiments, the method may further comprise providing an activator for activating the at least one transceiver at the device purchase location.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 1A-1K provide illustrations of electronic payment device arrangements in various embodiments;

FIGS. 2A-2F illustrate various embodiments of carriers attached to transceivers without enclosures.

FIG. 2G illustrates an embodiment of a carrier attached to a transceiver with an enclosure.

FIG. 7 provides an illustration of an exemplary data configuration for use with host systems in various embodiments of the invention;

DETAILED DESCRIPTION OF THE INVENTION

1. Electronic Payment Device Arrangements

Embodiments of the invention provide methods and systems for electronic payment involving transceiver-based payment device arrangements. FIGS. 1A-1K illustrate various embodiments of these arrangements, highlighting some exemplary configuration options.

Each arrangement is illustrated with only one transceiver. However, it will be appreciated that each arrangement may comprise multiple transceivers which may or may not be related to one another. Also, each transceiver is illustrated herein as a simple black box, roughly sized to accommodate typical transceiver circuitry. It will be appreciated, however, that there may exist many ways to produce a transceiver for use with the various embodiments of the invention. For example, processes have been demonstrated for printing passive radio-frequency identification (RFID) tags on sheets of polymer. The process involves affixing a small integrated circuit to the polymer and printing an antenna on the polymer using a special printer. Using a similar process, it may be possible to print a roll of RFID tags. A consumer may then buy a sheet of transceivers, similar to buying a sheet of postage stamps, tearing off individual transceivers at perforations in the polymer sheet.

Figure 1A:
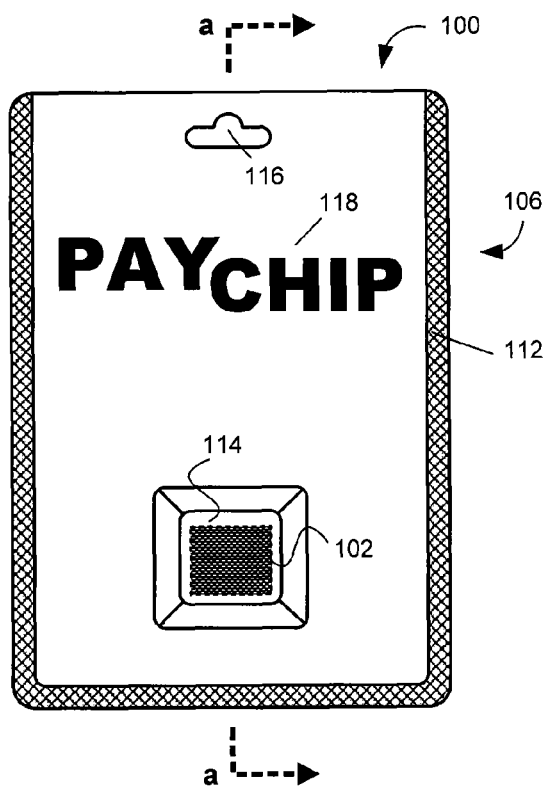
Figure 1B:
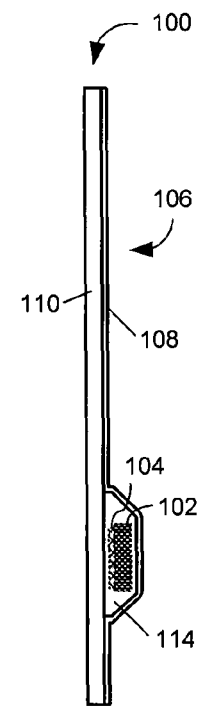

FIGS. 1A and 1B illustrate an exemplary arrangement 100 comprising a transceiver 102, an attachment 104, and packaging 106. FIG. 1B shows a section cut view of FIG. 1A taken at a-a.

The attachment 104 is shown coupled with the transceiver 102. As illustrated, the attachment 104 may be a square of double-sided adhesive, where one side is permanently adhered to the transceiver 102, and the other side is temporarily covered with a removable paper like a wax paper. By removing the paper, the adhesive may become exposed, allowing a consumer to adhere the transceiver 102 to a carrier, like a watch (see discussion of FIG. 2 below for more on carriers). It will be appreciated that the attachment 104 may be any chemical, mechanical, or other type of attachment suitable to attach the transceiver 102 to a carrier. For example, suitable attachments may include adhesives, pins, magnets, or threaded fasteners. Further, attachments may be generalized for a variety of carriers or customized to particular carriers; they may be permanent or temporary; and they may be fixed or removable.

The packaging 106 is shown removably coupled with the transceiver 102 and configured for display at a device purchase location. In FIGS. 1A and 1B, the packaging comprises a molded sheet of transparent plastic 108 which is attached to a sheet of cardboard 110 using glue around three edges 112. This forms a bubble 114 large enough to house the transceiver 102. The packaging 106 further comprises a cutout 116 punched through both the plastic 108 and cardboard 110, and shaped to accommodate a typical display hook for a display at a device purchase location. The cardboard 110 has a printed label 118 which displays certain product features, like the name and value, through the plastic 108.

Figure 1C:
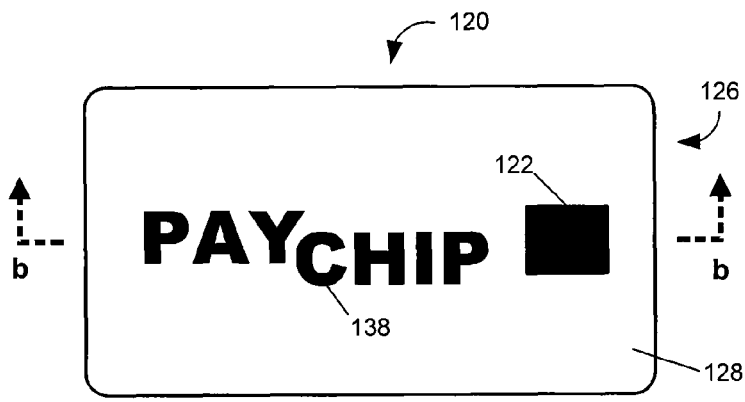
Figure 1D:
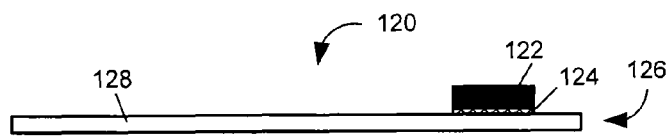

FIGS. 1C and 1D illustrate another exemplary arrangement 120 comprising a transceiver 122, an attachment 124, and packaging 126. FIG. 1D shows a section cut view of FIG. 1C taken at b-b.

In FIGS. 1C and 1D, the packaging 126 comprises an opaque plastic card 128, approximately the dimensions of a typical credit card. The packaging 126 is removably coupled with the transceiver 122, by having the card 118 temporarily attached to the transceiver 128 using the attachment 124. Thus, the packaging may comprise the attachment. The packaging may also comprise a printed label 138.

FIGS. 1E-1F illustrate other of the many additional embodiments of electronic payment device arrangements.

In FIG. 1E, the attachment comprises a wristband 132 coupled to a transceiver 134. The packaging comprises a price tag 136, removably coupled to the transceiver 134 via the attachment wristband 132.

In FIG. 1F, the arrangement comprises an elastic band 142 coupled to a transceiver 144 via a yoke 146. The band 142 may be used as packaging and hung from a hook or other display apparatus. Additionally, a consumer may use the band 142 as an attachment by securing the transceiver 144 to a carrier with the band 142 and yoke 146. Thus, the attachment may comprise the packaging. Alternately, a consumer may remove the yoke 146 from the band 142, and thread it onto a necklace or bracelet. In this way, the yoke 146 would become the attachment, and the band 142 would remain the removed packaging.

FIGS. 1H-1K illustrate still other of the many additional embodiments of electronic payment device arrangements. FIG. 1H shows a section cut view of FIG. 1G taken at c-c; and FIG. 1K shows a section cut view of FIG. 1J taken at d-d.

In FIGS. 1G and 1H, the packaging 152 further comprises an enclosure 154. The enclosure 154 may removably enclose the transceiver 156. FIG. 1H shows the enclosure with a seam 162, allowing the transceiver 156 to be removed from the enclosure 154. In this configuration, pieces of the enclosure 154 may be snapped together (e.g. by a friction fit connection) or screwed together (e.g. by a threaded connection). The pieces are molded so that when connected, a void 164 is formed in which the transceiver 156 may be stored.

FIG. 1H also shows an attachment 158 operatively coupled to the transceiver 156 by being directly coupled to the enclosure 154. It will be appreciated that in other arrangements, the enclosure 154 may enclose both the transceiver 156 and an attachment, or a plurality of transceivers and attachments. Thus, the enclosure 154 may be used as a carrier or it may be attached to a carrier.

Further, the enclosure 154 may comprise the attachment. For example, the enclosure 154 may comprise magnets or fasteners, or it may even be molded to become the male or female portion of a connection point on a carrier. In addition to various types of functional enclosures, some arrangements may comprise purely aesthetic enclosures. In these embodiments, the enclosure 154 may comprise features to make the payment device more attractive to a consumer.

The packaging in FIGS. 1G and 1H further comprises a piece of cardboard 160 temporarily affixed to the enclosure 154 by the attachment 158 for display purposes. It will be appreciated that the enclosure may be affixed to other packaging in many other ways. For example, it may be attached using shrink wrap, magnets, twist ties, Velcro, and molded connectors. It will also be appreciated that the enclosure may be displayed without extra packaging, and in at least that way, the enclosure may comprise the packaging.

In FIGS. 1K and 1J, the packaging 162 comprises a permanent enclosure 164 shaped like a gift card. As illustrated, the enclosure 164 comprises a plurality of layers of material 166 enclosing the transceiver 168. The various layers 166 may be formed of the same or different materials in the same or different thicknesses. Further, the layers 166 may be assembled into the enclosure 164 in any appropriate way, including using adhesive, heat, or molded connections. For example, the outer layers may be thin plastic laminate glued to inner layers of cardboard. It will be appreciated that many other configurations of permanent enclosures are possible.

Regardless of whether the arrangement comprises an enclosure, the attachment may be configured to attach the transceiver to a carrier, either directly or via an enclosure. Anything capable of carrying the transceiver can become a carrier. FIGS. 2A-2G illustrate a number of carrier configurations.

2. Electronic Payment Device Carriers

FIGS. 2A-2F illustrate various embodiments of carriers attached to transceivers without enclosures. Specifically, in each embodiment, a transceiver 202 is attached to a carrier 200 with an attachment (not shown). One type of carrier is clothing and accessories, like the purse 200-1, belt 200-2, and hat 200-3 illustrated in FIGS. 2A-2C, respectively. Other carriers in this category include, but are not limited to, eyeglasses, jackets, shirts, pants, shoes, watches, and jewelry. Another type of carrier is portable electronic devices, like the music player 200-4 and cell phone 200-5 illustrated in FIGS. 2D and 2E, respectively. Other carriers in this category include, but are not limited to, portable digital assistants (PDA's), portable electronic games, portable recorders, pagers, and portable computers. Yet another type of carrier is stationary-type goods, like the greeting card 200-6 illustrated in FIG. 2F. Other carriers in this category include, but are not limited to, gift wrapping supplies, bags, notebooks, and writing implements.

Of course many other carriers are possible in many other categories, as well. For example, it may be desirable to attach a transceiver to a credit card, a toy, a wheelchair, or a cane. Further, special purpose clothing, accessories, and other carriers may be made available to consumers. For example, a belt may comprise a Velcro patch sized and positioned for convenient attachment and removal of one or more payment devices.

By way of example, a consumer may purchase an electronic payment device in the arrangement illustrated by FIGS. 1A and 1B. The consumer may open the packaging 106 by separating the plastic 108 from the cardboard backing 110. The consumer may then remove the transducer 102 from the bubble 114 in the plastic 108, remove any backing to expose the attachment 104, and use the attachment 104 to attach the transducer 102 to a carrier, such as the ones illustrated in FIGS. 2A-2F. Similarly, a consumer may purchase an electronic payment device in the arrangement illustrated by FIGS. 1C and 1D. The consumer may remove the transceiver 122 by peeling the removable adhesive attachment 124 from the packaging 126. Then, as above, the consumer may use the attachment 124 to attach the transceiver 122 to a carrier as in FIGS. 2A-2F.

Even though the transceivers 202 in FIGS. 2A-2F are illustrated without enclosures, it will be appreciated that many types of enclosures may be used in conjunction with the carrier types embodied in those and other illustrations. FIG. 2G highlights one exemplary embodiment wherein an enclosure is used as part of the attachment to the carrier.

In FIG. 2G, the transceiver 252 is enclosed in an enclosure 254. The enclosure 254 is attached to a key ring 250, which is acting as a carrier. The enclosure 254 is similar to the various embodiments illustrated by FIGS. 1G and 1H, but with an added hole configured for a set of chain links 256. The illustrated attachment to the carrier 250 therefore comprises the enclosure 254 and set of chain links 256. In other similar key ring embodiments, the key ring may attach directly to the enclosure, or the attachment may comprise other elements, such as a karabiner or clip. It will be appreciated that the use of different types of enclosures may add numerous other potential embodiments for using the invention with many types of carriers.

3. Electronic Payment Device Displays

Figure 3A:
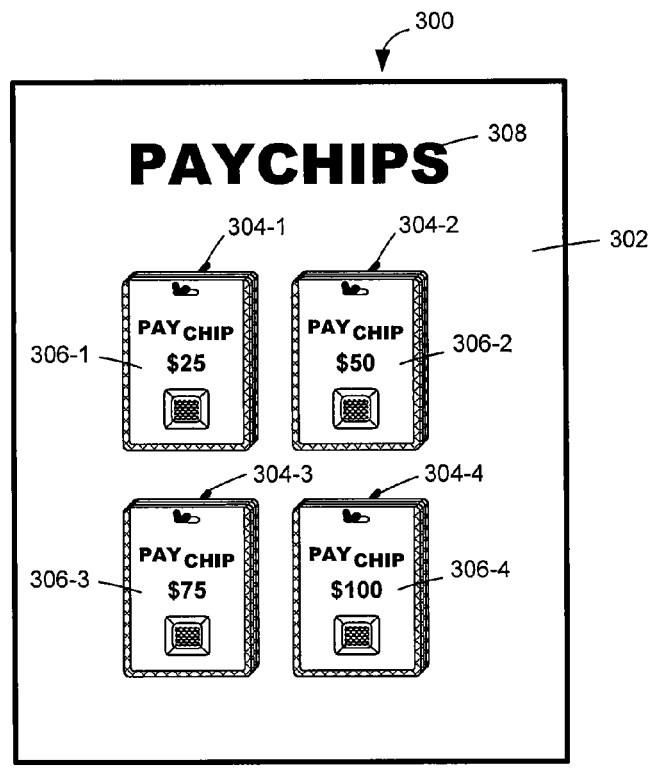
FIGS. 3A and 3B provide illustrations of display configurations for electronic payment device arrangements in various embodiments.
Figure 3B:
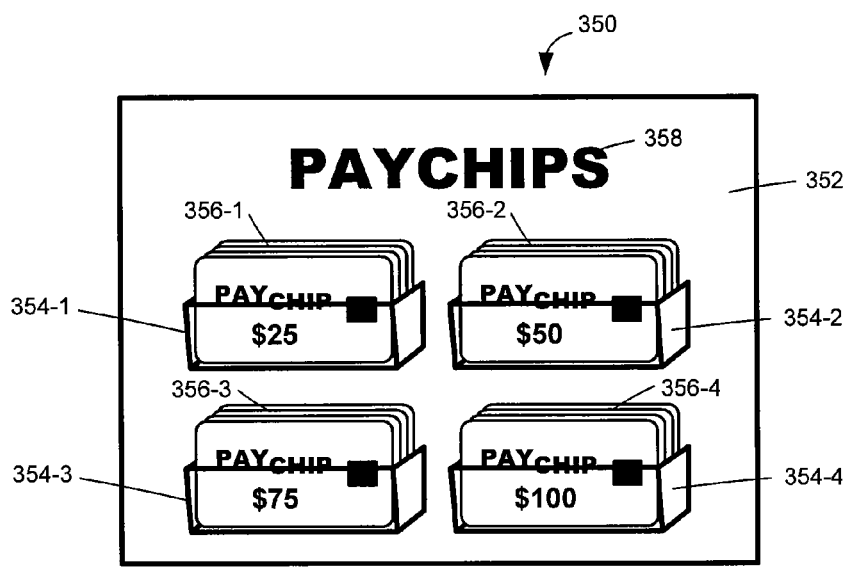

In FIGS. 1A-1K, the illustrated arrangements comprise packaging configured to display the payment device for sale at a device purchase location. A device purchase location may be a storefront, kiosk, vending machine, e-commerce website, or any other suitable location for purchasing an electronic payment device. The various device purchase locations may choose to display the payment device arrangements for sale in various ways. In some cases, the display will involve a display apparatus. FIGS. 3A and 3B illustrate two exemplary embodiments of displays comprising display apparatuses.

In FIG. 3A, the display 300 comprises a rack 302. The rack 302 uses a plurality of hooks 304 to display a plurality of electronic payment device arrangements 306. It will be appreciated that the hooks 304 may be made of a number of materials (including plastic, metal, wood, ceramic, or composite) and in a number of shapes. Each hook 304 may also be shaped to attach or to accommodate hardware to attach to the rack 302, and the rack 302 may be configured to accommodate the attachment of the plurality of hooks 304. As illustrated, the hooks 304 are configured to accommodate arrangements such as those arrangements 100, 130, 140, and 150 illustrated in FIGS. 1A, 1E, 1F, and 1G, respectively.

In FIG. 3B, the display 350 comprises a rack 352. The rack 352 uses a plurality of bins 354 to display a plurality of electronic payment device arrangements 356. The bins 354 may be semi- or fully-transparent in part or in whole to facilitate the display of various features of the electronic payment device arrangements 356. For example, the bins 354 may be made of substantially transparent plastic, allowing a consumer to see the cash equivalence associated with the arrangements displayed in each bin. It will be appreciated that the bins 354 may me made of any material and may be of any shape suitable for the display of electronic payment device arrangements 356. As illustrated, the bins 354 are configured to accommodate arrangements such as those arrangements 120 and 160 illustrated in FIGS. 1C and 1J, respectively.

Both the hooks 304 of FIG. 3A and the bins 354 of FIG. 3B may further comprise advertisement information. This advertisement information may comprise logos, words, illustrations, images, sounds, lights, or any other way of enticing a consumer to purchase an electronic payment device arrangement. Further, the advertisement information may be incorporated into the hooks 304 or bins 354, as with integrated circuitry or colored materials; or it may be applied to the hooks 304 or bins 354, as with labels or paint.

Additionally, the plurality of hooks 304 or bins 354 may be used to display arrangements with different characteristics. For example, the illustrated arrangements 306 and 356 comprise payment devices with different cash equivalents, like the $25 arrangements 306-1 and 356-1 and the $50 arrangement 306-2 and 356-2. It will be appreciated that other features may be desirable to display separately. For example, different arrangements may comprise different aesthetic enclosures with different designs, or different numbers of transceivers per arrangement (e.g. single packs versus multi-packs).

It will be appreciated that many custom and standard types of displays exist which may be configured to display electronic payment device arrangements. It will also be appreciated that arrangements can be created or adapted in many ways for display in various types of displays. Further, displays may comprise multiple types of display apparatuses configured to display multiple types of arrangements. For example, the hooks 304 and bins 354 of FIGS. 3A and 3B may both be used on a single rack to display arrangements 306 and 356 simultaneously.

4. Electronic Payment Systems

Figure 4A:
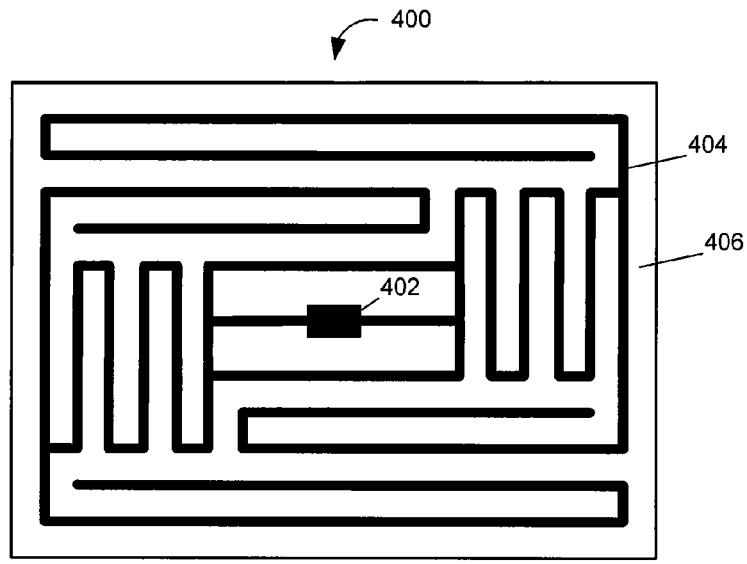
FIGS. 4A and 4B show illustrative embodiments of different types of transceivers.
Figure 4B:
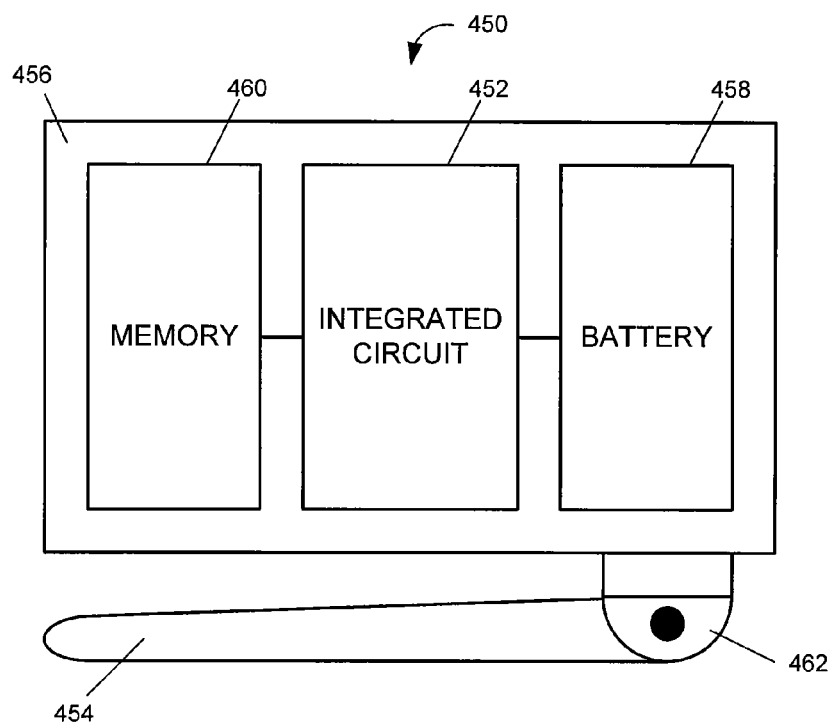

The electronic payment devices described herein may be used in conjunction with an electronic payment system. The system may read the payment device and communicate with other financial systems and databases to execute financial transactions. The payment systems of the present invention make use of transceivers in various embodiments. Those transceivers may be active, passive, or semi-active (also called semi-passive). FIGS. 4A and 4B show illustrative embodiments of different types of transceivers.

FIG. 4A illustrates an exemplary passive transceiver which may be used with various embodiments of the invention. The transceiver 400 comprises an integrated circuit (IC) 402 and an antenna 404, attached to a backing 406. The backing 406 may comprise silicon, polymer, or any other suitable material.

FIG. 4B illustrates an exemplary active transceiver which may be used with various embodiments of the invention. Similar to a passive transceiver, the active transceiver 450 may comprise an integrated circuit (IC) 452 and an antenna 454, attached to a backing 456. The backing 456 may similarly comprise silicon, polymer, or any other suitable material.

Unlike a passive transceiver, the active transceiver 450 may further comprise a battery 458 or other power supply. The power supply 458 may be on board, or external to the transceiver 450. The power 458 may allow the transceiver 450 to support expanded memory 460, and a more powerful antenna 454.

Further, FIG. 4B shows the antenna 454 attached externally to the transceiver backing 456 via a connector 462. Similar antenna connectors to connector 462 may be used with any type of transceiver, though they are more common with active transceivers.

Figure 5:
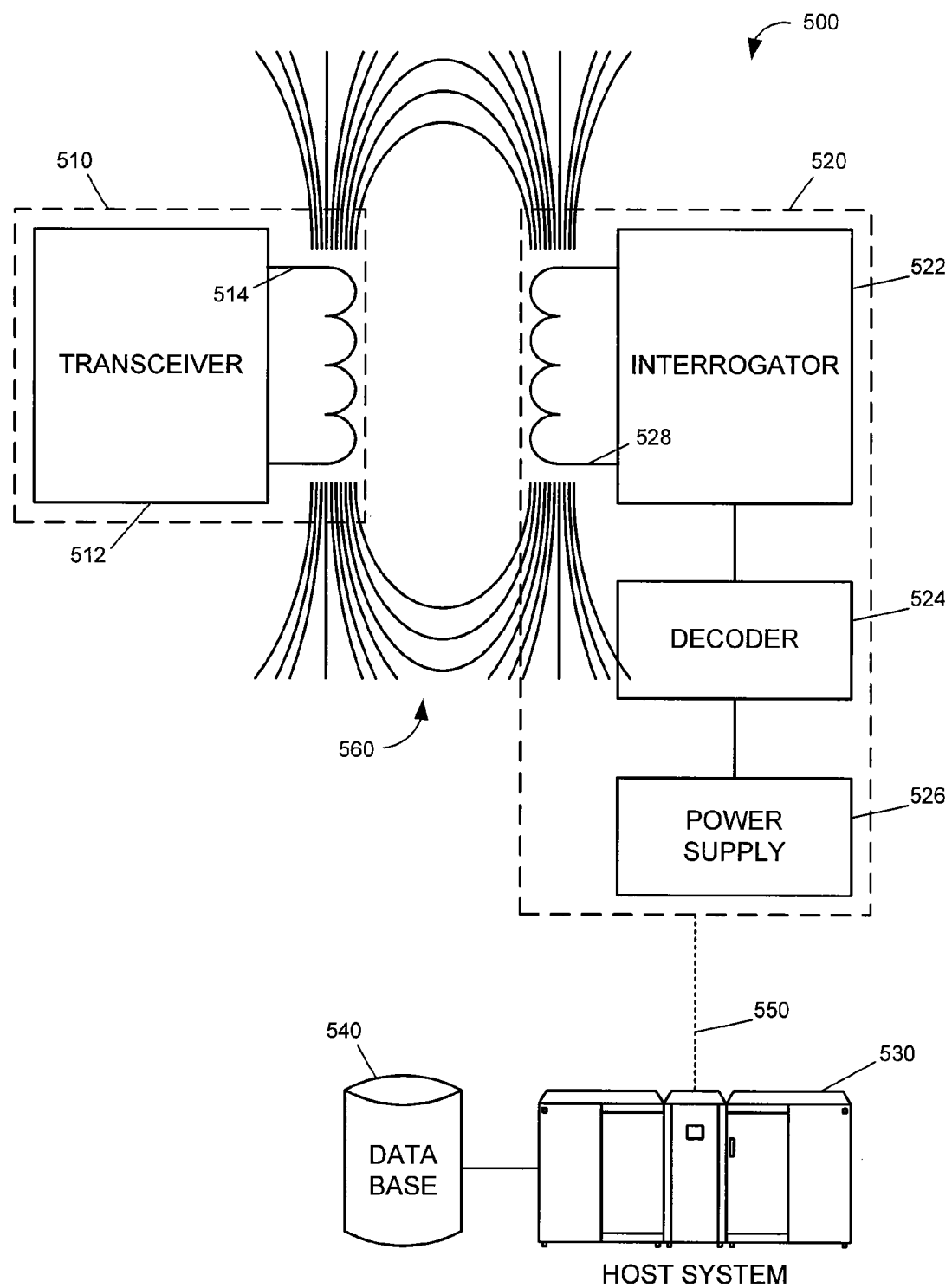
FIG. 5 provides a schematic illustration of an embodiment of an electronic payment system for use with various embodiments of the invention.

FIG. 5 provides an exemplary electronic payment system for use with various embodiments of the invention. The system 500 may comprise an electronic payment device 510, a reader 520, a host system 530, and a database 540. As discussed with regard to FIGS. 4A and 4B, the transceiver may comprise circuitry 512 and an antenna 514. The reader 520 may comprise an interrogator 522, a decoder 524, a power supply 526, and an antenna 528.

The reader 520 may also comprise an operative connection 550 to the host system 530. The operative connection 550 may include, but is not limited to, wired links, wireless links, virtual channel connections, satellite links, or any other suitable physical or virtual data channel. The reader 520 may further comprise any connectors or other hardware or software needed to support the connection 550 to the host system 530.

The database 540 may be separate from or a part of the host system 530. Further, the database 540 may be localized, distributed, relational, or any other type or combination of types suitable to support embodiments of the invention. The database 540 and host system 530 are operatively connected by any suitable data channel 552 and may further comprise elements necessary to support that data channel 552.

The reader 520 may communicate with the payment device 510 by establishing either a physical or virtual data channel. Some readers 520 may require physical contact with the payment device 510. In most cases, however, the communication with be established without contact through a virtual data channel. For example, the reader 520 and payment device 510 may communicate by transmitting optical or electromagnetic (e.g. radio-frequency) signals, or by sensing changes in electromagnetic fields. By way of example, FIG. 5 illustrates this connection as an electromagnetic field 560.

By way of example, the system may be configured to transact with a passive transceiver (like the one illustrated by FIG. 4A) as follows.

The interrogator 522 transmits a signal to the antenna 528, which generates and emits an electromagnetic field 560 from the reader 520. The shape, frequency, duty cycle, and other characteristics of the field may be selected to accommodate certain design considerations. For example, where the reader is powered by battery, the field may be generated intermittently to conserve power.

When the antenna 514 of the electronic payment device 510 passes through the electromagnetic field 560 of the reader 520, the field 560 may induce a signal in the payment device's antenna 514 (e.g. through mutual inductance). This signal may in turn generate sufficient power to drive the transceiver circuitry 512. The circuitry 512 may then transmit a signal comprising a code from its antenna 514 back to the reader through the reader's antenna 528. The decoder 524 decodes the code and communicates relevant information with the host system 530 via the connection 550.

The code allows the payment device to work with various embodiments of electronic payment systems. Some of these embodiments are illustrated in FIGS. 6A-6C.

Figure 6A:
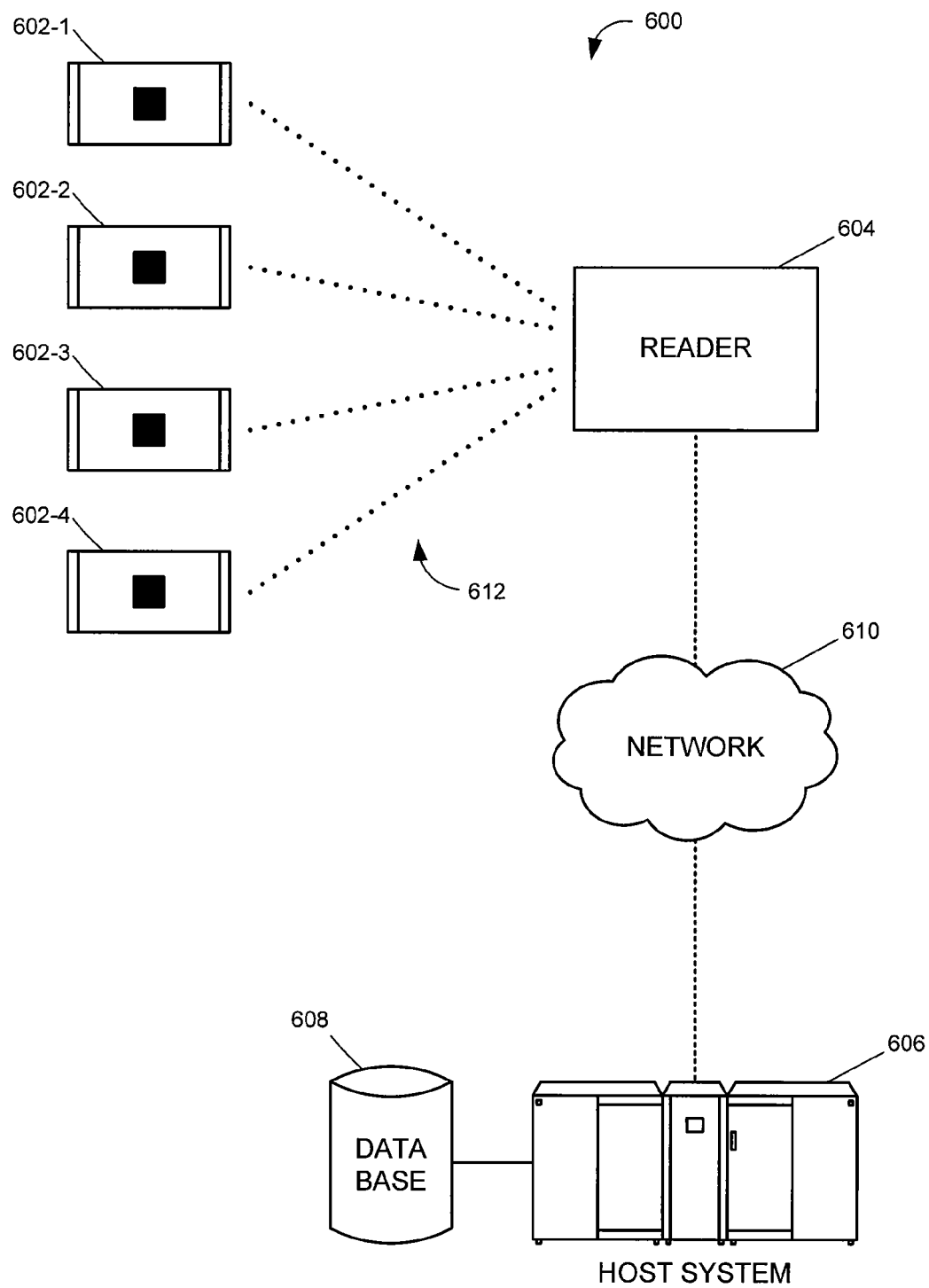
FIGS. 6A-6C provide system-level illustrations of system configurations for use with various embodiments of the invention.
Figure 6B:
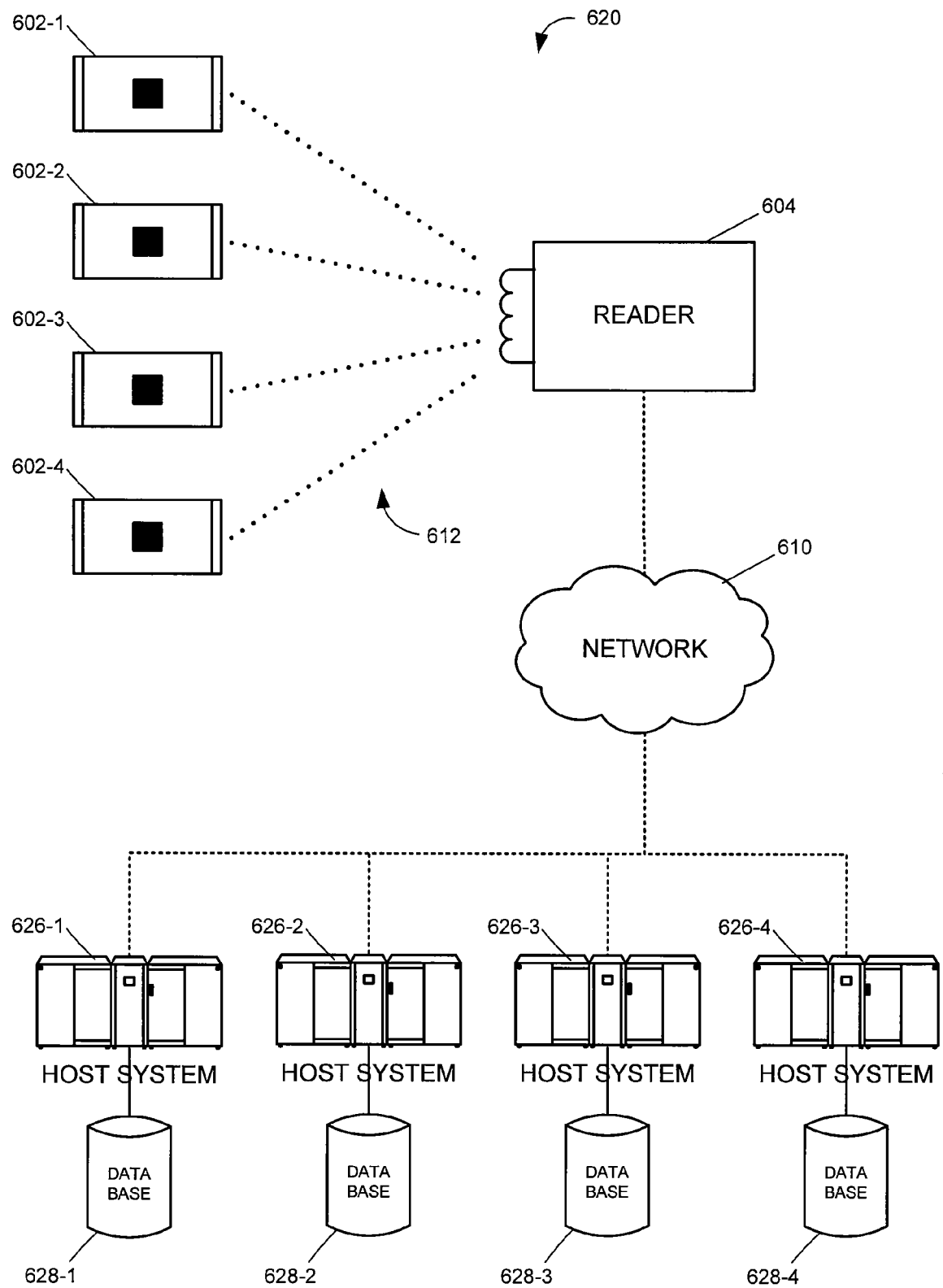
Figure 6C:
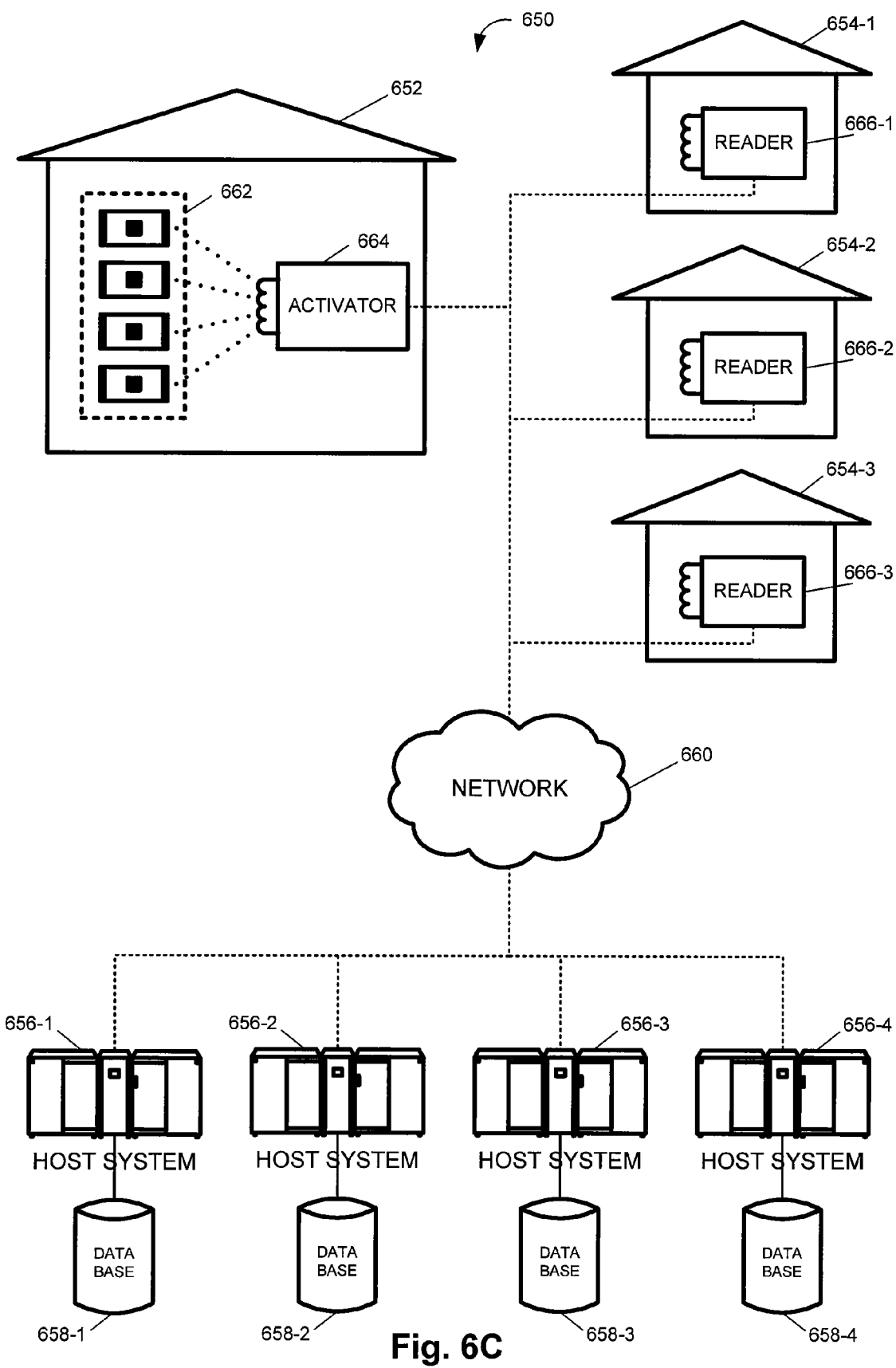

FIG. 6A provides an electronic payment system 600 comprising a plurality of electronic payment devices 602, a reader 604, a host system 606, and a database 608. The reader 604 is operatively connected to the host system 606 through a network 610. Each of the plurality of payment devices 602 is configured to be read by the reader 604, and the reader 604 is configured to read each of the plurality of payment devices 602.

The code allows the reader 604 to identify each payment device 602. For example, when a payment device (e.g. 602-1) enters the field generated by the reader 604, the device 602-1 is induced to transmit a code stored in its memory. The memory may have just enough capacity to store this code, or it may be capable of storing more. The code identifies to the reader 604 that the payment device 602-1 is nearby or is otherwise requesting a transaction.

To identify the associated payment device, the code may comprise a set of bits. The code may or may not be unique in part or in whole for each device. In one example, multiple devices may be somehow linked with a common code. In another example, the code may be effectively unique. Making the code effectively unique may involve distributing devices with similar or identical codes to remote geographical destinations, thereby minimizing the chance that two devices with the same code will be used in the same geographic region. Alternatively, the code may be linked with one or more other identifiers. These other identifiers may include, but are not limited to, account numbers, biometric information, and point of sale identifiers.

FIG. 6B provides an electronic payment system 620 similar to the system 600 illustrated in FIG. 6A. The embodiments illustrated by FIG. 6B, however, comprise a plurality of host systems 626 and databases 628.

As in FIG. 6A, when the electronic payment device 602-1 enters the field generated by the reader 604, the device 602-1 may be induced to transmit a code back to the reader 604. Because the reader is operatively connected to multiple host systems 626, the reader must determine with which host system to communicate.

This determination may be accomplished in a number of ways. In one way, the reader 604 may transmit the code which identifies the payment device to multiple host systems 626. Each host system 626 may then check to see if it is configured to transact with the device 602 associated with the code. For example, device 602-1 may be associated with an account which resides on database 628-1. Thus, only host system 626-1 will find the payment device in its system and the other host systems (626-2, 626-3, and 626-4) will not participate in the transaction.

In a second way, the code may comprise routing information. When the code is transmitted to the reader 604, the reader 604 may parse the routing information from the code. The routing information may be associated with a specific host system or a specific category of host systems. The reader 604 may then use the routing information to determine with which host system or category of host systems to communicate. For example, payment device 602-2 may have been issued by Device Company, which owns host systems 628-3 and 628-4. When the device 602-2 is used at a point of sale, it transmits a code to the reader 604 comprising routing information. The routing information tells the reader 604 to transact only with one of host systems 628-3 or 628-4.

It will be appreciated that systems with multiple host systems 626 may exist in many embodiments. Further, all or some of the host systems 626 may be interrelated or connected by other internal or external networks. The databases 628 may be shared or distributed among multiple host systems 626, and a single host system 626 may us multiple databases 628.

Further, many embodiments comprise multiple readers, as illustrated in FIG. 6C. FIG. 6C provides an electronic payment system 650 comprising a device purchase location 652, a plurality of points of sale 654, and a plurality of host systems 656. The device purchase location 652 comprises a plurality of electronic payment devices 662 available for sale, and an activator 664. The activator 664 may be identical to the readers discussed herein, or may be specially configured to activate the electronic payment devices 662. Each point of sale comprises a reader 666. It will be appreciated that some or all of the activator and readers may be separate from or integrated with other payment systems. Further, one or more components of a reader, like an interrogator or antenna, may be integrated with another payment system. For example, reader 666-1 may be integrated into a magstripe reader at point of sale 654-1. Some exemplary payment systems with which the activator or reader may be integrated are also described in U.S. Pat. Nos. 6,886,742, 6,827,260 and 7,086,584, the complete disclosures of which are herein incorporated by reference. The activator 664 and readers 666 are all operatively connected to the host systems 656 through a network 660.

It will be appreciated that many similar configurations are possible. For example, multiple device purchase locations may exist, points of sale may also act as device purchase locations, the activator and various readers may connect to various host systems through multiple networks, and some readers and activators may only be operatively connected to some host systems. Further, activation may involve the packaging or attachment. For example, packaging may be configured so that removal of the packaging allows or causes activation of the payment device.

In some configurations, each database comprises a set of attributes associated with each electronic payment device. An exemplary embodiment of this database is illustrated in FIG. 7. The database may be used with various embodiments of the invention, including those illustrated by FIGS. 5 and 6A-6C. The database 700 is illustrated as a relational table, with attributes 702 represented by columns and values 706 represented by rows. It will be appreciated that many data structures may be suitable for storing this database, including flat files, arrays, and relationally-managed database systems (RMDBS). Further, the headings, values, arrangement, and other illustrated features of the data represent only a small subset of the potential data types, values, and configurations. Thus, the sorted array 700 illustrated by FIG. 7 is intended only as one embodiment of the data.

The database 700 in FIG. 7 comprises a set of attributes 702 related to a code 704 associated with a payment device (not shown). For each code associated with a payment device, the set of attributes may comprise an account number 702-1 designating the account associated with the payment device, an ACTIVE flag 702-2 representing the active or inactive status of the payment device, a balance 702-3 reflecting the current cash equivalence of the payment device, an any number of other attributes (702-4 through 702-N). Where many electronic payment devices exist, many codes will exist, each with its own set of related attribute values (706-1 through 706-N).

Various examples of device conditions and related attributes are discussed below with reference to the database 700. Specific fields are designated by their row-column designation. For example, the balance relating to code 00000003 is designated by "(706-3, 702-3)."

In a first example, row 706-1 provides attribute values relating to a device with code 00000001 (706-1, 704). The device relates to account number 419352801 (706-1, 702-1), which is active (706-1, 702-2) and carries a remaining balance of $1.93 (706-1, 702-3). This may be the condition of a payment device in use by a consumer. The device may have been pre-loaded with a cash equivalent, some of which has been expended. The account number may be any number which identifies the related account, including a number relating to the owner of the device, activator, reader, or host system; or a number which is randomly, semi-randomly, sequentially, or algorithmically generated.

In a second example, row 706-2 provides attribute values relating to a device with code 00000002 (706-2, 704). Perhaps because the balance of the device has reached $0.00 (706-2, 702-3), the device and its related account (706-2, 702-1) have become inactive (706-2, 702-2). In some embodiments, a device account may automatically de-activate when the balance reaches zero. In other embodiments, the device holder may have to de-activate the account. In some embodiments, it may also be possible to recharge (i.e. add money to) the balance. In those and other embodiments, it may be undesirable to automatically deactivate the account upon reaching a zero balance.

In a third example, row 706-5 provides attribute values relating to a device with code 00000005 (706-5, 704). This device may have been pre-loaded with a balance of $50.00 (706-5, 702-3). Though the device is associated with an account (706-5, 702-1), the account has not yet been activated (706-5, 702-2). This condition may occur at an intermediate stage of activation, after an account has been chosen but before it has been activated. The condition may also occur in embodiments where selection of an associated account occurs separate from and preceding activation of the account. For example, a point of sale or host system may automatically associate account numbers with a set of payment devices before the devices are distributed or sold.

In a fourth example, row 706-N provides attribute values relating to a device with code 49758201 (706-N, 704). This device may have been pre-loaded with a balance of $25.00 (706-N, 702-3). The device is not associated with an account (706-N, 702-1) and is inactive (706-N, 702-2). In some embodiments, it may not be possible to activate a device without first associating it with an account. In other embodiments, sets of devices may be distributed (e.g. to wholesalers, device purchase locations, or consumers) without associated accounts. In still other embodiments, it may be possible to dissociate an account from a device. Account management options may provide potential benefits in areas including code and device reuse, security, and customer management.

5. Electronic Payment Methods

The various payment systems of the present invention may be used to execute methods for payment and other transactions related to electronic payment devices.

Figure 8:
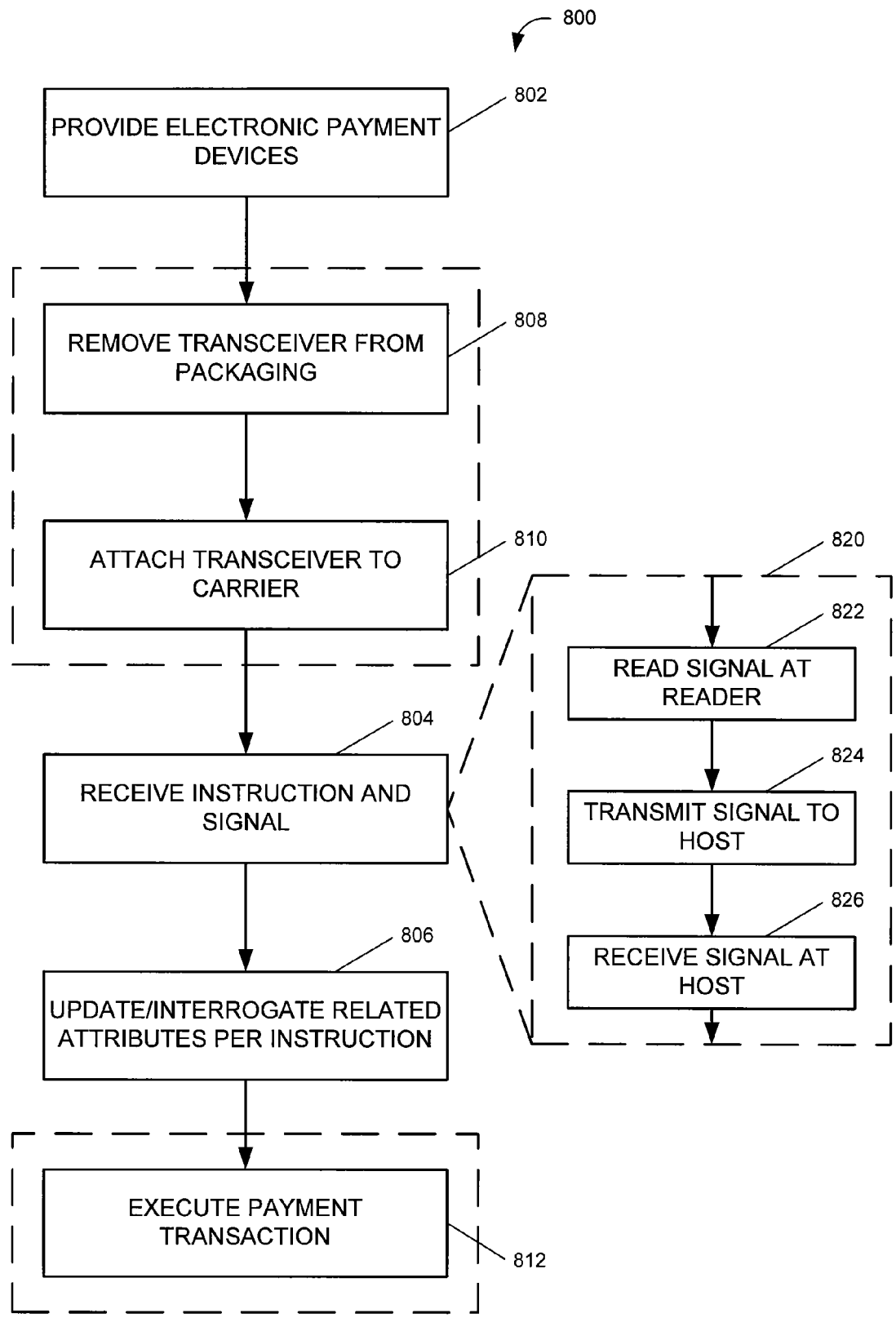
FIG. 8 provides a flow diagram summarizing methods for updating attributes for use with various embodiments of the invention.

For example, FIG. 8 provides various embodiments of methods for using an electronic payment device with an electronic payment system. The method 800 begins with the provision 802 of electronic payment devices. This may occur at a device purchase location where the devices may be provided to consumers for purchase. The electronic payment device may comprise at least one transceiver, an attachment, and packaging.

Prior to using the device, the transceiver may need to be removed 808 from its packaging. A consumer also may desire to attach 810 the transceiver to a carrier. For example, a consumer may attach the transceiver to a belt and use the transceiver (e.g. make a purchase) with the transceiver attached. Once the consumer returns home, the consumer may then desire to move the transceiver from the belt to a purse for storage or future transactions. The attachment may also be such that the transceiver is removed for use. For example, a consumer may have the transceiver in an enclosure attached to a belt. To use the transceiver, the consumer may remove the transceiver from the enclosure or remove the enclosure from the belt. Further, special carriers, such as special purpose clothing and accessories may cause the transceiver to require or not require removal for use.

When the payment device is used, an instruction and signal may be received 804. The signal may comprise a code associated with the transceiver. In some embodiments, one or both of the instruction and signal may be transmitted from the transceiver to a reader. In some embodiments, the reader reads 822 the signal transmitted by the transceiver. The signal is then transmitted 824 to a host system, and the host system receives 826 the signal. In certain embodiments, the instruction may be generated by the reader, and in other embodiments, the instruction may be generated by the host system.

The host system may be operatively connected to one or more databases in various embodiments of the invention including those illustrated in FIGS. 5 and 6A-6C. Further, the database comprises a set of attributes related to the codes associated with the transceivers. An exemplary embodiment of the database is illustrated in FIG. 7.

The host system may query the database to find the attributes related to the code associated with the transceiver being used. Related attributes may then be updated or interrogated 806 as instructed by the instruction.

Referring to the table of attributes 700 in FIG. 7, for example, it will be appreciated that updating or interrogating 806 related attributes may affect or determine the state of a transceiver or an associated account. For example, various interrogate instructions may be passed from the reader to the host system to determine whether an account is active, what balance remains in an account, or other information. These interrogate instructions may further comprise validate or authorize instructions.

Many types of update instructions are possible, as well. In one example, a consumer may wish to activate or de-activate a payment device. The reader may pass an activate instruction to the host system, which may cause the ACTIVE flag 702-2 to toggle. This may activate or de-activate the account associated with the transceiver. In another example, a consumer may wish to recharge the balance on the account associated with the payment device. The reader may pass a recharge instruction to the host system, which may cause the balance 702-3 to increment by some predetermined amount. Similarly, a consumer may wish to execute 812 a payment transaction, such as purchasing a good or service. The reader may pass a payment instruction to the host system, which may cause the balance 702-3 to decrement by the amount of the purchase.

Figure 9:
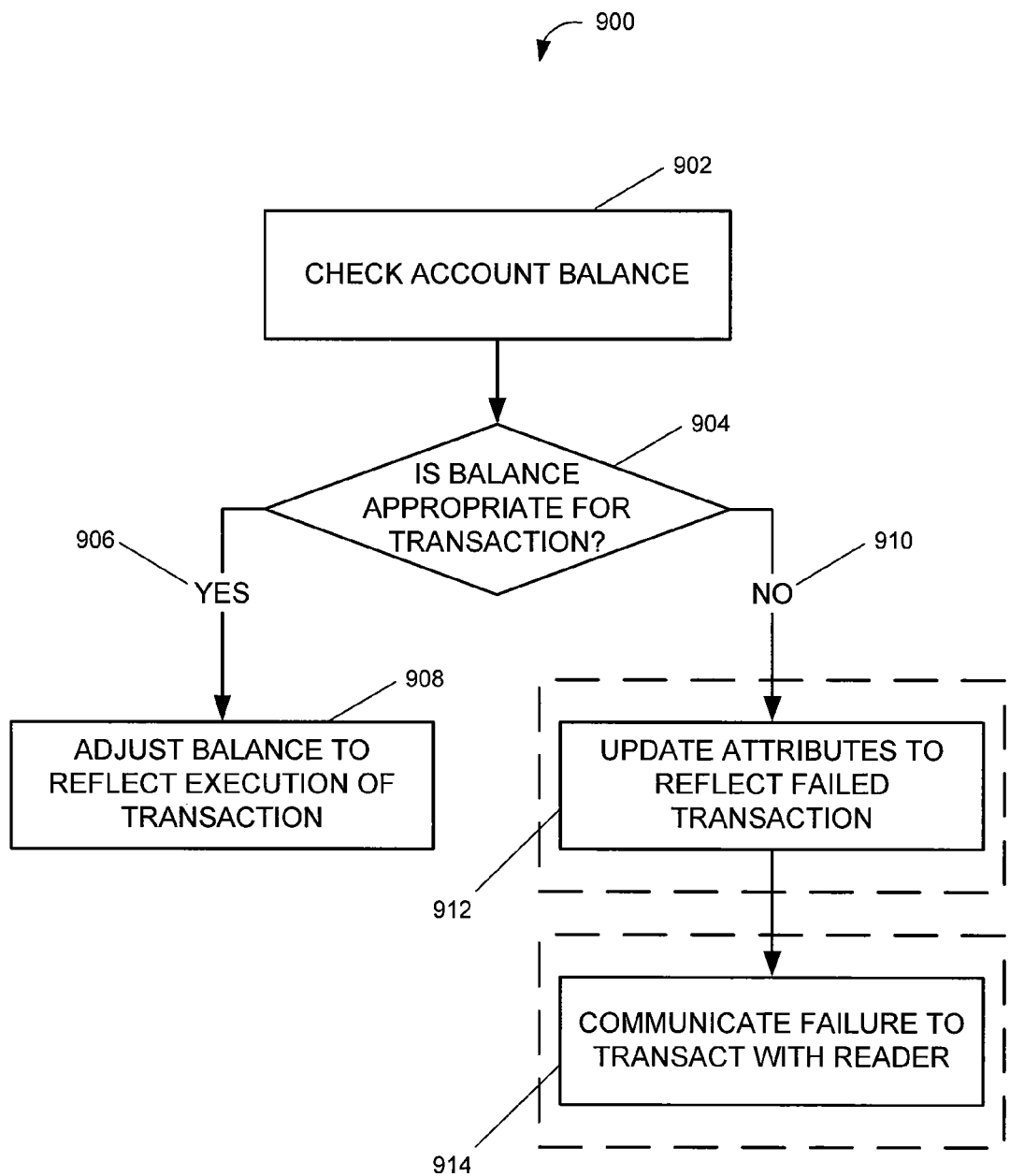
FIG. 9 provides a flow diagram summarizing a more-detailed embodiment of a method for executing a payment transaction in various embodiments of the invention.

FIG. 9 provides an exemplary method 900 in which both update and interrogate instructions are used. This method 900 may be executed when an electronic payment device is used to attempt a payment transaction at a point of sale. The method begins by checking 902 an account balance. This balance may be associated with the account relating to the payment device being used. The step may be performed in a number of ways, including by passing an interrogate instruction from the reader to the host system, and having the host system interrogate a balance field in the database.

A decision 904 is then reached as to whether the balance is appropriate for the transaction. If the transaction is a purchase, an appropriate balance may require sufficient funds to exist in the account for making the purchase. Other types of transactions may be possible, as well. For example, certain types of transactions may require minimum or maximum balances, or certain transactions may increment balances (e.g. returns).

If the balance is appropriate 906 for the transaction, the method may adjust 908 the balance to reflect the execution of the transaction. For example, if the transaction is a purchase, the balance may be decremented by the amount of the purchase.

If the balance is not appropriate 910 for the transaction, the transaction may fail. In some embodiments, the balance may still proceed. For example, A purchase transaction may be allowed to proceed even without sufficient funds, causing the balance to decrement to a negative value. In other embodiments, one or more attributes may be updated 912 to reflect the failed transaction. For example, it may be desirable for a host system to keep track of failed transactions for purposes including fraud detection, customer support, or marketing research. In still other embodiments, the failure to transact may be communicated 914 back to the reader. This may be accomplished actively, for example by transmitting a signal from the host system to the reader; or it may be accomplished passively, for example by not transmitting a signal telling the reader that a transaction was successful. In the latter case, the reader may wait for some predetermined amount of time, after which it may assume that the transaction was unsuccessful. In certain of these embodiments, the reader may be configured to communicate the failed transaction to the consumer.

6. Distribution of Electronic Payment Devices

Figure 10:
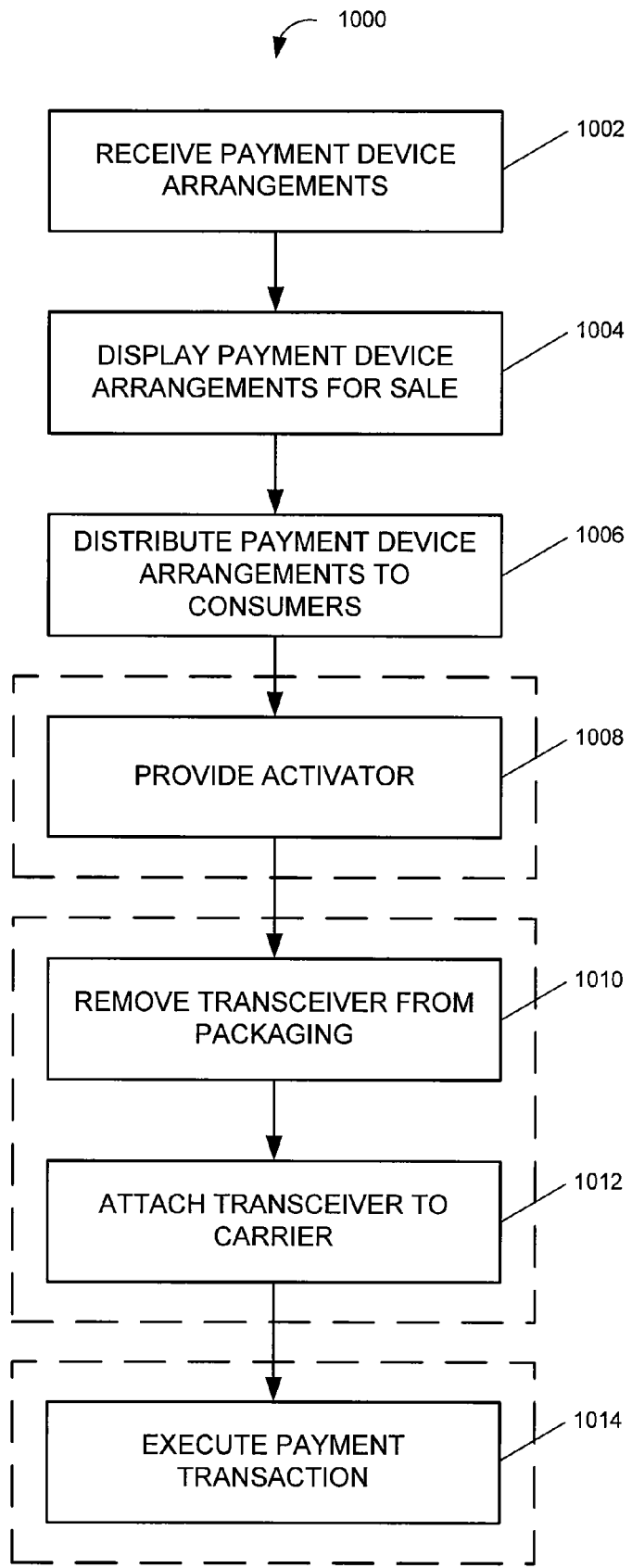
FIG. 10 provides a flow diagram summarizing methods of distributing electronic payment devices for use with various embodiments of the invention.

In order for the electronic payment devices and systems to be used, it may be necessary to first distribute the payment devices to consumers. FIG. 10 provides methods 1000 for distributing electronic payment device arrangements to consumers.

Electronic payment device arrangements are received 1002. The arrangements may be received in may different embodiments, including those illustrated in FIGS. 1A-1K. The arrangements may be received at a device purchase location from a distributor. The device purchase location may also be its own distributor. The payment device arrangements are displayed 1004 for sale. The device purchase location may display the arrangements in many different ways, including the ways illustrated in FIGS. 3A and 3B. The arrangements are then distributed 1006 to consumers. They may be offered for sale, given away for promotional or other reasons.

In some embodiments, the device purchase location may provide an activator, as in the embodiment illustrated in FIG. 6C. Consumers may use the activator to activate the transceiver (or the account associated with the payment device).

In other embodiments, the transceiver may be removed 1010 from its packaging and attached 1012 to a carrier, as in the embodiments illustrated in FIGS. 2A-2G. In still other embodiments, the transceiver may be used to execute a transaction, like a payment transaction. This may be accomplished, for example, by an embodiment of the method provided by FIG. 8.

It will be appreciated that components of the systems described herein can be rearranged or connected differently to perform similar or identical functions; and steps of the methods described herein may be performed in alternate orders and still provide similar or identical results. Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. An electronic payment device arrangement for use by a consumer, the device arrangement comprising:
    a transceiver identifiable by a code;
    an attachment coupled with the transceiver, the attachment comprising an adhesive configured to adhesively couple the transceiver to a first carrier; and
    packaging removably coupled with the transceiver, wherein:
        the packaging is configured to display the transceiver for sale at a device purchase location;
        the packaging comprises an enclosure;
        the enclosure removably encloses the transceiver;
        the enclosure is configured to function as a second carrier; and
        the enclosure is configured to be separated from the transceiver for the transceiver to be coupled with the first carrier.

2. The device arrangement recited in claim 1, wherein the code comprises account information.

3. The device arrangement recited in claim 1, wherein the code comprises routing information.

4. The device arrangement recited in claim 3, wherein:
    the transceiver is configured to be read by a reader communicatively coupled with a plurality of host systems;
    the routing information comprises a host identifier associated with at least one of the plurality of host systems; and
    the reader is configured to use the routing information to communicate with the at least one host system associated with the host identifier.

5. The device arrangement recited in claim 1, wherein the transceiver is configured for activation at the device purchase location.

6. The device arrangement recited in claim 5, wherein activation comprises removing at least a portion of the packaging.

7. The device arrangement recited in claim 1, wherein the transceiver is configured to be read by a reader located at a point of sale.

8. The device arrangement recited in claim 1, wherein the transceiver is configured to be read by a reader communicatively coupled with a host system.

9. An electronic payment device arrangement for use by a consumer, the device arrangement comprising:
    a first means for transceiving, the first means being identifiable by a code;
    a second means for adhesively coupling the first means to a third means; and
    a fourth means for packaging, wherein:
        the fourth means comprises a means for enclosing the first means;
        the means for enclosing the first means removably encloses the first means;
        the means for enclosing the first means is configured to be separated from the first means for tranceiving such that the first means can be coupled with the third means;
    the fourth means is removably coupled with the first means; and
    the fourth means is configured to display the first means for sale at a device purchase location.

10. The device arrangement recited in claim 9, wherein the code comprises account information.

11. The device arrangement recited in claim 9, wherein the code comprises routing information.

12. The device arrangement recited in claim 11, wherein:
    the first means is configured to be read by a fifth means for reading, the fifth means being communicatively coupled with a plurality of host systems;
    the routing information comprises a host identifier associated with at least one of the plurality of host systems; and
    the fifth means is further configured to use the routing information to communicate with the at least one host system associated with the host identifier.

13. The device arrangement recited in claim 9, wherein the first means is configured to be activated at the device purchase location.

14. The device arrangement recited in claim 9, wherein the first means is configured to be read by a fifth means for reading located at a point of sale.

15. The device arrangement recited in claim 9, wherein the first means is configured to be read by a fifth means for reading communicatively coupled with a host system.

16. A system for electronic payment, the system comprising:
   a plurality of payment device arrangements, each comprising:
      at least one transceiver,
      an attachment coupled with the at least one transceiver, the attachment comprising an adhesive configured to adhesively couple the at least one transceiver to a first carrier, and
      packaging removably coupled with the at least one transceiver, wherein:
         the packaging is configured to display the at least one transceiver for sale at a device purchase location;
         the packaging comprises an enclosure;
         the enclosure removably encloses the transceiver;
         the enclosure is configured to function as a second carrier; and
         the enclosure is configured to be separated from the transceiver for the transceiver to be coupled with the first carrier;
   a reader configured to:
      receive from the at least one transceiver a signal comprising a code being at least one of a set of codes and associated with the at least one transceiver and an account, and
      transmit the received code and an instruction to a host system;
   the host system being communicatively coupled with the reader and configured to:
      receive the transmitted code and the transmitted instruction from the reader, and
      perform a function according to the transmitted instruction using the transmitted code and a function attribute; and
   a database communicatively coupled with the host system and configured to store the set of codes and a table, the table comprising a set of related attributes for each of the set of codes, the function attribute being at least one of the set of related attributes.

17. The system recited in claim 16, wherein:
   the instruction comprises an update command for updating the set of related attributes related to the account associated with the code, and
   the function updates the function attribute as directed by the update command.

18. The system recited in claim 17, wherein the update command comprises at least one of an activate command for activating the account for a certain monetary amount, a de-activate command for de-activating the account, or a recharge command for recharging a balance associated with the account.

19. The system recited in claim 16, wherein:
   the instruction comprises an interrogate command for interrogating the set of related attributes related to the account associated with the code, and
   the function interrogates the function attribute as directed by the interrogate command.

20. The system recited in claim 19, wherein the interrogate command comprises at least one of a validate command for validating the activated status of the account, or a balance inquiry command for checking a balance associated with the account.

21. A method for updating attributes relating to an electronic payment apparatus, the method comprising:
   providing a plurality of electronic payment device arrangements, each comprising:
      at least one transceiver,
      an attachment coupled with the at least one transceiver, the attachment comprising an adhesive configured to adhesively couple the at least one transceiver to a first carrier, and
      packaging removably coupled with the at least one transceiver, wherein:
         the packaging comprises an enclosure;
         the enclosure removably encloses the transceiver;
         the enclosure is configured to function as a second carrier;
         the enclosure is configured to be separated from the transceiver for the transceiver to be coupled with the first carrier; and
         the packaging is configured to display the at least one transceiver for sale at a device purchase location,
   receiving an instruction and a signal, the signal being transmitted from the at least one transceiver and comprising a code, the code being one of a set of codes each associated with the at least one transceiver and an account;
   updating a set of related attributes as instructed by the instruction, wherein the set of related attributes relates to the at least one transceiver associated with the code.

22. The method recited in claim 21, further comprising:
   removing the at least one transceiver from the packaging; and
   attaching the at least one transceiver to the carrier with the attachment.

23. The method recited in claim 21, further comprising using the at least one transceiver to execute a payment transaction.

24. The method recited in claim 21, wherein the receiving step comprises:
   reading the signal at a reader;
   transmitting the signal from the reader to a host system; and
   receiving at the host system the signal.

25. The method recited in claim 21, wherein the receiving step comprises:
   reading the signal at a reader;
   transmitting the signal and the instruction from the reader to a host system; and
   receiving at the host system the signal and the instruction.

26. The method recited in claim 21, wherein the instruction comprises an account status change command for changing a status of the account associated with the code, changing the status of the account comprising at least one of activating the account for a certain monetary amount, de-activating the account, or recharging a balance associated with the account.

27. The method recited in claim 21, wherein the instruction comprises an interrogate command for interrogating the set of related attributes related to the account associated with the code, interrogating the set of related attributes comprising at least validating a status of the account associated with the code, or checking a balance associated with the account associated with the code.

28. The method recited in claim 21, wherein:
   the instruction comprises a payment command; and
   updating the set of related attributes as instructed by the instruction comprises:

checking a balance associated with the account to verify that the balance is appropriate for executing a payment transaction, and adjusting the balance to reflect the execution of the payment transaction when the balance is appropriate.

29. The method recited in claim 28, wherein the updating step further comprises adjusting the set of related attributes to reflect a failed transaction when the proper balance is unavailable.

30. The method recited in claim 28, wherein the updating step further comprises communicating failure of the transaction to the reader when the proper balance is unavailable.

31. The method recited in claim 28, wherein adjusting the balance comprises decrementing the balance.

32. A method for distributing an electronic payment apparatus for sale, the method comprising:

receiving a plurality of electronic payment device arrangements, each arrangement comprising:
at least one transceiver;
an attachment coupled with the at least one transceiver, the attachment comprising an adhesive configured to adhesively couple the at least one transceiver to a first carrier, and
packaging removably coupled with the at least one transceiver, wherein:
the packaging comprises an enclosure;
the enclosure removably encloses the transceiver;
the enclosure is configured to function as a second carrier; and
the enclosure is configured to be separated from the transceiver for the transceiver to be coupled with the first carrier; and
the packaging is configured to display the at least one transceiver for sale at a device purchase location;
displaying the plurality of arrangements on a display apparatus for sale at the device purchase location; and
distributing at least one of the plurality of arrangements to a consumer upon purchase by the consumer.

33. The method recited in claim 32, further comprising:
removing the at least one transceiver from the packaging; and
attaching the at least one transceiver to the carrier with the attachment.

34. The method recited in claim 32, further comprising using the at least one transceiver to execute a payment transaction.

35. The method recited in claim 32, further comprising providing an activator for activating the at least one transceiver at the device purchase location.

* * * * *